United States Patent
Schwab et al.

(10) Patent No.: US 9,332,100 B2
(45) Date of Patent: May 3, 2016

(54) PORTABLE COMMUNICATIONS DEVICE

(75) Inventors: Barry H. Schwab, West Bloomfield, MI (US); John G. Posa, Ann Arbor, MI (US)

(73) Assignee: RATEZE REMOTE MGMT. L.L.C., Wilmington, DE (US)

( * ) Notice: Subject to any disclaimer, the term of this patent is extended or adjusted under 35 U.S.C. 154(b) by 737 days.

(21) Appl. No.: 12/388,267

(22) Filed: Feb. 18, 2009

(65) Prior Publication Data

US 2009/0254826 A1 Oct. 8, 2009

Related U.S. Application Data

(63) Continuation of application No. 09/900,827, filed on Jul. 6, 2001.

(60) Provisional application No. 60/219,381, filed on Jul. 19, 2000.

(51) Int. Cl.
| | |
|---|---|
| *H04M 1/00* | (2006.01) |
| *H04M 1/27* | (2006.01) |
| *G09B 5/06* | (2006.01) |
| *H04M 1/2745* | (2006.01) |

(52) U.S. Cl.
CPC .............. *H04M 1/271* (2013.01); *G09B 5/065* (2013.01); *H04M 1/274558* (2013.01)

(58) Field of Classification Search
CPC ......... G06F 15/0283; G06F 17/30787; H04M 1/2471
USPC .................. 379/110.01, 93.17, 381, 382, 355
See application file for complete search history.

(56) References Cited

U.S. PATENT DOCUMENTS

| | | | | |
|---|---|---|---|---|
| 4,838,796 | A | * 6/1989 | Gozdowiak | ............ G09B 19/00 434/224 |
| 5,075,894 | A | 12/1991 | Iwase et al. | |
| 5,157,783 | A | * 10/1992 | Anderson | ......... G06F 17/30637 |
| 5,277,429 | A | * 1/1994 | Smith, III | ........... A63F 3/00006 273/249 |
| 5,437,552 | A | * 8/1995 | Baer | ..................... G09B 5/062 434/308 |
| 5,534,888 | A | 7/1996 | Lebby | |

(Continued)

OTHER PUBLICATIONS

Eric Cosatto & Hans Peter Graf, Sample-Based Synthesis of Photo-Realistic Talking Heads, Jun. 8-10 1998, Computer Animation 98. Proceedings, AT&T Labs.-Res., Red Bank, NJ, USA ; Graf, H.P.*

(Continued)

*Primary Examiner* — Wesley Kim
*Assistant Examiner* — Richard Chan
(74) *Attorney, Agent, or Firm* — Brundidge & Stanger, P.C.

(57) ABSTRACT

Improvements to enhance electronic books, particularly improvements having both a viewing and audio enunciation capability are disclosed. A exemplary user control is provided enabling a reader to receive a "recap" up to a point designated by the reader or, alternatively, allow the reader to "finish the book" by being provided with a summary, covering the material from a given point to the end. In another example, a pointing device (e.g., a touch pad) is provided along with curser on the display, enabling a reader to click on words for additional information. In still another example, when material of any kind is "read" to a user, the device may be used to automatically display images on the display screen associated with the material being read. In another example, an electronic book may be provided with a communications link or a short-range radio transmitter, such as a low-power FM transmitter.

17 Claims, 2 Drawing Sheets

(56) References Cited

U.S. PATENT DOCUMENTS

| | | | |
|---|---|---|---|
| 5,636,267 A | | 6/1997 | Utsumi et al. |
| 5,664,227 A | * | 9/1997 | Mauldin ............ G06F 17/30843 707/E17.028 |
| 5,713,741 A | | 2/1998 | DeMars |
| 5,761,485 A | * | 6/1998 | Munyan ............... G06F 15/0283 326/8 |
| 5,774,109 A | | 6/1998 | Winksy et al. |
| 5,788,507 A | * | 8/1998 | Redford ................ G06F 3/0605 340/12.54 |
| 5,796,816 A | * | 8/1998 | Utsumi ............... H04M 1/2745 370/264 |
| 5,835,667 A | * | 11/1998 | Wactlar ............. G06F 17/30787 386/241 |
| 5,991,594 A | | 11/1999 | Froemer |
| 6,041,300 A | | 3/2000 | Ittycheriah et al. |
| 6,081,730 A | | 6/2000 | Lieben et al. |
| 6,148,173 A | * | 11/2000 | Bell ........................ G09B 5/04 40/455 |
| 6,157,621 A | | 12/2000 | Brown et al. |
| 6,157,844 A | * | 12/2000 | Doran ................... H04M 1/271 455/518 |
| 6,240,168 B1 | * | 5/2001 | Stanford ............. H04M 1/2473 379/110.01 |
| 6,408,327 B1 | * | 6/2002 | McClennon et al. ......... 709/204 |
| 6,512,749 B1 | | 1/2003 | Wright et al. |
| 6,597,669 B1 | | 7/2003 | Takahashi et al. |
| 6,721,577 B2 | | 4/2004 | Humes |
| 6,804,338 B1 | | 10/2004 | Chen |
| 7,304,635 B2 | * | 12/2007 | Seet ...................... G06F 3/0483 345/156 |
| 2002/0191776 A1 | | 12/2002 | Khan |
| 2006/0168539 A1 | | 7/2006 | Hawkins et al. |
| 2007/0005616 A1 | * | 1/2007 | Hay ........................ G06Q 30/06 |
| 2009/0254826 A1 | * | 10/2009 | Schwab ................. G09B 5/065 715/716 |
| 2009/0322673 A1 | * | 12/2009 | Cherradi El Fadili .. G06F 3/017 345/157 |
| 2015/0248685 A1 | * | 9/2015 | McLean ............. G06Q 30/0205 705/7.34 |

OTHER PUBLICATIONS

"Non Final Office Action", U.S. Appl. No. 09/900,827, (Apr. 28, 2009), 18 pages.
"Non-Final Office Action", U.S. Appl. No. 09/900,827, (Oct. 30, 2009), 16 pages.
"Final Office Action", U.S. Appl. No. 09/900,827, (May 12, 2010), 17 pages.
"Advisory Action", U.S. Appl. No. 09/900,827, (Sep. 30, 2010), 2 pages.
Office Action dated Aug. 25, 2004 for U.S. Appl. No. 09/900,827.
Final Office Action dated Jun. 29, 2005 for U.S. Appl. No. 09/900,827.
Final Office Action dated Aug. 22, 2006 for U.S. Appl. No. 09/900,827.
Final Office Action dated Jul. 6, 2007 for U.S. Appl. No. 09/900,827.
Office Action dated Dec. 30, 2005 for U.S. Appl. No. 09/900,827.
Office Action dated Feb. 22, 2006 for U.S. Appl. No. 09/900,827.
Office Action dated Mar. 18, 2011for U.S. Appl. No. 09/900,827.
Office Action dated Sep. 21, 2011 for U.S. Appl. No. 09/900,827.

* cited by examiner

PORTABLE COMMUNICATIONS DEVICE

RELATED APPLICATIONS

This application claims priority as a continuation of U.S. patent application Ser. No. 09/900,827 which was filed on Jul. 6, 2001, which claims priority to U.S. Provisional Patent Application No. 60/219,381 which was filed on Jul. 19, 2000, the entire contents of each are incorporated herein by reference.

BACKGROUND

With the advent of lightweight, low-power mass storage media and efficient, high-resolution display technology, electronic books are becoming increasingly viable and popular. By "electronic," it is meant a portable device having a display and means for storing at least the text of a book so that a user can refer to this device and alter the display to effect page turning, and other operations. In addition to a textual or graphical display, future units also will include the ability to read the book to a user, if so desired, thereby providing a more modern version of a "book on tape."

In terms of the ways in which the reading material is loaded into the book, various techniques have been proposed. On the one hand, electronic book material may be provided in the form of an optical medium such as a compact disc or semiconductor memory module. Alternatively, such material may be downloaded from a website over the internet and stored in part, or in whole, temporarily or permanently.

SUMMARY

Enhancements to electronic books are described, particularly those having both a viewing and audio enunciation capability. For example, according to one aspect, a user control is provided enabling a reader to receive a "recap" up to a point designated by the reader or, alternatively, allow the reader to "finish the book" by being provided with a summary, covering the material from a given point to the end. Such recap/summary information may be in the form of a displayed synopsis or spoken audio output.

According to a different aspect, a pointing device such as a touch pad is provided along with curser on the display, enabling a reader to click on words for additional information. Preferably, upon selecting the given word in the text, the pull down menu is generated with choices further defining the reader's interests. For example, such a pull-down menu may include sub-categories, such as the definition of the word, the meaning of the word in context, or, in the case of a pronoun or personal pronoun, information about a character in the story, such as a family tree or genealogy.

According to a yet a further aspect, when material of any kind is "read" to a user, be it the text of the electronic book itself or the recap/summary/auxiliary information, the invention may be used to automatically display images on the display screen associated with the material being read, to better understand, or to better enjoy, the electronic book. For example, when the text of the book or summary information is being read, the invention may be used to automatically generate an image of a narrator whose lips (or other body parts) move in accordance with the material being read. In more sophisticated embodiments, the text of the book may be analyzed in terms of content and images may be accessed and/or synthesized in accordance with subject matter.

As yet a further option, an electronic book may be provided with a communications link or a short-range radio transmitter, such as a low-power FM transmitter, enabling a book which is presented as read out loud to instead be transmitted to a radio receiver in a car, for example, enabling all of the occupants thereof to enjoy the reading through a higher-quality audio system. In this particular embodiment, where there is dialog between two or more people, the electronic book preferably would automatically generate separated left- and right-channel audio, so that the listener would have the impression that the characters of the book are, in fact, separated by a physical distance during their conversation. Non-vocal sounds, such as thunder, crashes and other audio effects also should be introduced so as to appear to sound at the appropriate distance using this technique.

DETAILED DESCRIPTION

Figure 1:
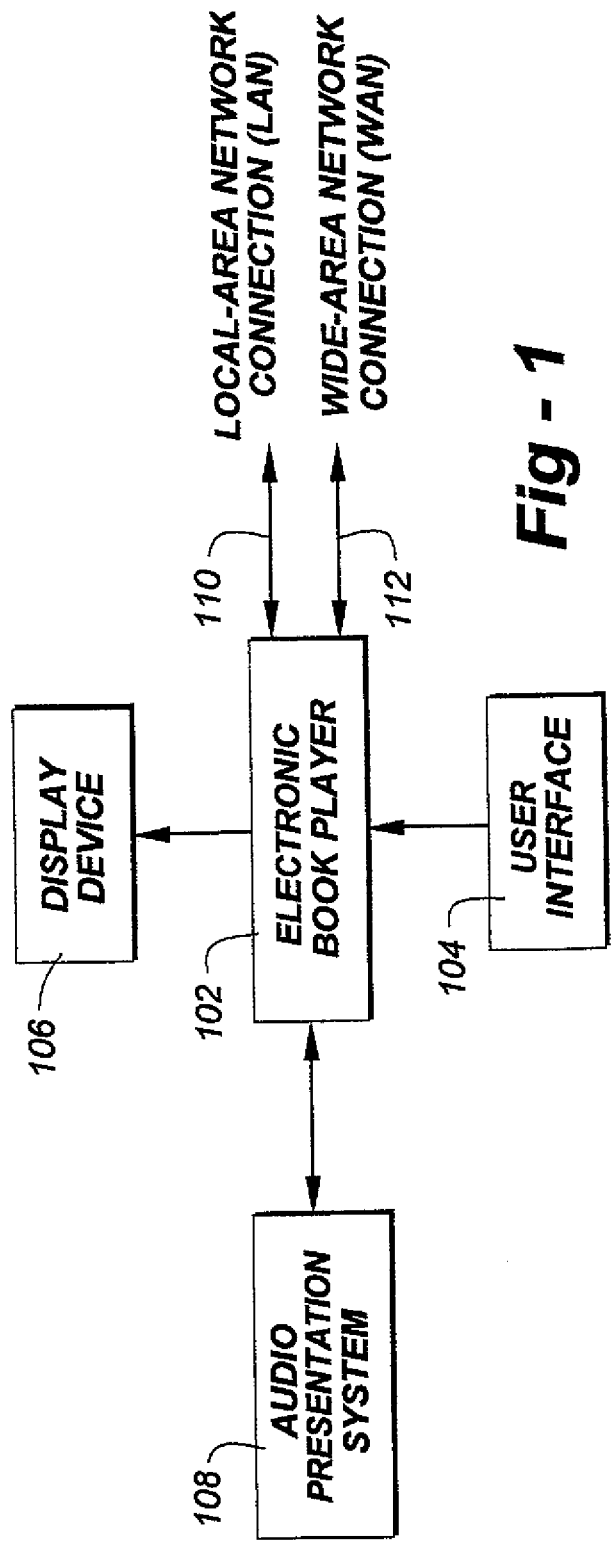
FIG. 1 shows an example of one possible implementation.

One problem with paper-based books is that when they are set down for a long period of time, it is difficult for a reader to remember details of the plot, who the characters are, and so forth, such that reference must often be made to previous chapters to recap what has happened. Similarly, there are cases where a reader is nearly finished or halfway through a book, and does not desire to finish the book, but would like to know how it ends.

According to one aspect, a user control is provided with facilities, either as a manual switch or soft key on the display, whereby a reader may have the electronic book provide a recap up to a point designated by the reader or, alternatively, allow the reader to "finish the book" by being provided with a summary, covering the material from a given point to the end. Such recap/summary information may be in the form of a displayed synopsis or spoken audio output.

The recap or summary material may either be furnished by the provider of the book itself in the electronic form or, alternatively, an intelligent algorithm may be used to automatically synthesize a summary of previously read or yet-to-be read material, based on analysis of the content. Programs of this kind are already available to provide abstracts of scientific papers, summary of electronic mail, and so forth. Since an automatically generated summary may be objectionable as inaccurate or distasteful to the author, a summary which is provided by the publisher, or supplied directly by the author is preferred, in which case such summaries preferably would be provided on a chapter by-chapter bases, although, for greater resolution, summaries on a per-page basis are also possible.

According to a different aspect, a pointing device such as a touch pad is provided along with curser on the display, enabling a reader to click on words for additional information. Preferably, upon selecting the given word in the text, the pull down menu is generated with choices further defining the reader's interests. For example, such a pull-down menu may include sub-categories, such as the definition of the word, the meaning of the word in context, or, in the case of a pronoun or personal pronoun, information about a character in the story, such as a family tree or genealogy. This might be particularly advantageous in for complex historical books and novels which span more than one generation, and often are based on lengthy and confusing family trees.

These aspects are not limited in the way in which these recaps, summaries, or auxiliary information is provided. If the user does not wish to generate any sound, the information may be provided on the display itself in textual or graphical form or, alternatively, if the electronic book has an audio reading capability, the recap, summary, or auxiliary information may be "spoken to" the user. As with the textual delivery, the spoken delivery may either be provided, or downloaded, along with the reading material itself, or may be synthesized from the textual material utilizing, for example, automated text-to-speech conversion algorithms or hardware.

According to yet a further aspect, when material of any kind is "read" to a user, be it the text of the electronic book itself or the recap/summary/auxiliary information, the invention may be used to automatically display images on the display screen associated with the material being read, to better understand, or to better enjoy, the electronic book. For example, when the text of the book or summary information is being read, the invention may be used to automatically generate an image of a narrator whose lips (or other body parts) move in accordance with the material being read. As an option, a user may be able to specify a male, or female reader, along with male or female voice, and as a further option, the device may store images and voices of well-known narrators such as Charlton Heston, Stacy Keach, and so forth, so that a user not only may have the book read to them by a narrator on the display screen, but also may be able to choose a particular person from a stored library.

As a further option, the "reader" may be someone known to the person using the book, such as a mother or other friend or relative. In all such an implementation, at least the speaker's face is preferably digitized with different facial expressions and/or mouth movements, enabling the digitizations to be called up and displayed in accordance with the words being spoken. The prospective speaker(s) are also preferably asked to speak a predetermined set of words or sounds so that phonemes or other fundamental constructs may be used to synthesize the reading in that person's voice based upon the words being read.

The image and voice of the narrator may be stored in a complete or relatively complete form, or may be substantially synthesized by the device itself. For example, with a well-known narrator, a number of recorded slices of that person may be stored, each with a difference mouth opening, head position, blinking, and so forth, with the device automatically sequencing the slices to create a smooth appearance of talking in accordance with the words of the material being read.

Of course, with sufficient memory, an entire digital movie of the person actually reading the book may be played on the display in syndication with the words of the text. As a further alternative, a narrator or "talking head" may be synthesized entirely from graphical component parts, using very little memory, with text, speech again being used to synthesize a voice. By storing only a few of views of an individual, particularly with respect different mouth movements, a wide range of reader appearances may automatically be generated.

The invention is not limited to a single individual or simple graphics associated with a underlying electronic book, however. In more sophisticated embodiments, the text of the book may be analyzed in terms of content and images may be accessed and/or synthesized in accordance with subject matter. For example, in the case of a child's book without illustrations, sentences may, for example, be parsed into subject/object/verb, and images from a clip-art library, for example, may be assessed and moved onto the screen in accordance with actions implied by the book. For example, the "hippopotamus jumped for joy" may cause a simple clip-art figure of a hippopotamus, perhaps with its face changed to reflect a smile, to move up and down on the screen, with a synthesized background, to simulate a portion of the text.

For books for adults, on the other hand, more sophisticated images of people and places may be accessed or synthesized using graphically generation techniques, such as wire-frame and solids models, to simulate the content of a story. Again, so as not to be objectionable to the reader or the publisher, the publisher and/or author may collaborate to provide at least some of the images to be used in generating the graphics. The electronic book itself may be used to process these input images/movies and/or vocal constructs or, if the book is limited in terms of processing power, an external machine or web site may be used for processing to the results may be downloaded into the housing of the electronic book.

As yet a further option, an electronic book according to the invention may be provided with a communications link or a short-range radio transmitter, such as a low-power FM transmitter, enabling a book which is presented as read out loud to instead be transmitted to a radio receiver in a car, for example, enabling all of the occupants thereof to enjoy the reading through a higher-quality audio system. In this particular embodiment, where there is dialog between two or more people, the electronic book preferably would automatically generate separated left- and right-channel audio, so that the listener would have the impression that the characters of the book are, in fact, separated by a physical distance during their conversation. Non-vocal sounds, such as thunder, crashes and other audio effects also should be introduced so as to appear to sound at the appropriate distance using this technique.

FIG. 1 shows an example of one possible configuration of the various components which comprise the electronic book player system. The electronic book player unit 102 has a user interface 104, which may be physically located internal or external to the electronic book player unit 102. Similarly, a display device 106 may be located internal or external to the electronic book player 102.

An audio presentation system 108 provides playback of any audio signals produced by the electronic book player, and may be implemented as an internal amplifier and speakers, as an external amplifier and speakers, as headphones, or as any alternative using internal facilities or external facilities connected through a wired or wireless link. Additional facilities include an interface to a local area network 110 or a wide-area network 112. These network facilities may be utilized to retrieve book program material components, such as program text, graphical components, phoneme information, information describing characters and or narrators, or any type of data useful in the construction of the program audio, video, or graphics presentation.

Figure 2:
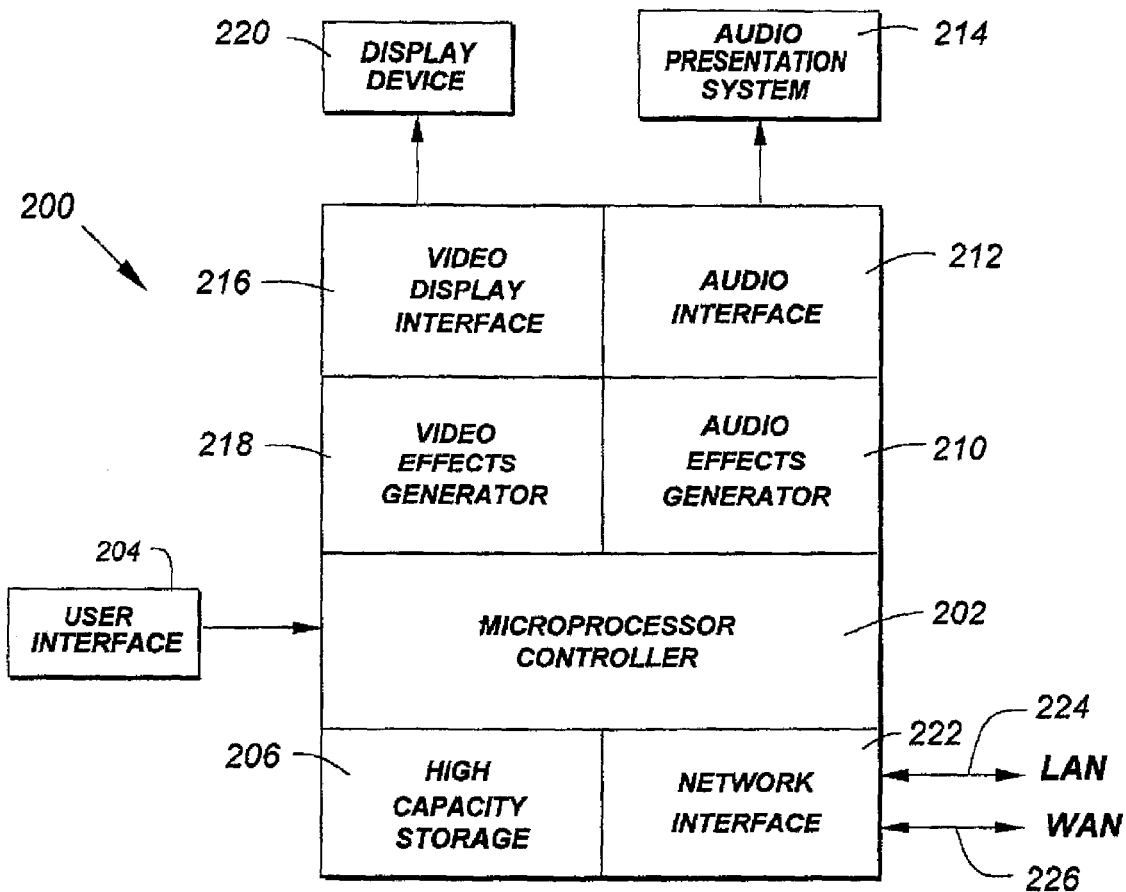
FIG. 2 shows a more detailed view of the functional components of the electronic book player unit.

FIG. 2 shows a more detailed view of the electronic book-player shown generally as 200. The components include a microprocessor controller 202 which provides the general processing, user interfacing, and specific program data processing. It also includes the usual components found in a personal computer motherboard, such as RAM and ROM memory, system BIOS, and so forth. The controller is connected to a user interface 204, which may be implemented internally or externally, and may include keyboards, "mouse" units, or similar interface devices.

The electronic book player may employ a high-capacity storage component 206, implemented as removable and/or non-removable storage, utilizing optical, magnetic, magneto-optical, semiconductor, or other storage devices. In practice, the storage may be as simple as a hard-disk drive, a CD-ROM player, or a plug-in module similar to the units commonly employed for consumer video-game systems. Alternatives would include any recordable medium, whether removable or non-removable.

The book program material components are implemented based on the type of content. For example, audio components, such as speech, music, sound effects, etc. are processed by the audio effects generator 210 and passed to the audio interface 214. These functions preferably are implemented using digital signal processing (DSP) components optimized for the type of data to be processed, such as audio data files, phenomes, actor data files (as explained herein below), and so forth. The audio presentation system 214 may be implemented using any convenient method, such as headphones, internal speakers, or an external stereo system.

Similarly, video and graphic program material components are implemented in the video effects generator 216, and passed to the video interface 218. As is the case for the audio components, these functions preferably are implemented using digital signal processing (DSP) components optimized for the type of data to be processed, such as video data files, graphic files, actor or prop data files (as explained herein below), and so forth. The video display 220 may be implemented using any convenient method, such as an internal liquid-crystal display, a video projection unit, or an alternative display device.

In the preferred embodiment, the various data book program material components may be received via a local area network (LAN) connection 224, or a wide-area network (WAN) connection 226. As an option, a link to a web site via the Internet could provide program material components at various levels of complexity and at different costs, ranging from free (or, included in the purchase price of the overall electronic book), or at a charge dependent on the specific features desired by the user. The internal or external data sources may include files which describe scenery, props, scene configuration, phenomes, the visual and audio characteristics of specific actors, the style and techniques of specific directors, or other data useful in the construction of the audio and video presentation of a specific scene.

As an example, the user might select the actors to play the parts (audio, video, or both), with the cost of the data files priced based on the popularity or skills of a particular actor. Thus, the portrayal of the character by a well-known actor might command a higher price than a portrayal by a newcomer-actor. In addition, the performance may be influenced by the selected actor, with a different interpretation by one actor than another. The performance of the cast as a whole may even be adapted based on a user selection of the "director", with the actors interpreting their parts in light of the preferences and techniques of the director. In this way, the user may select the cast from among any actor available, and have the performance of that cast directed by the director selected by the user. Depending on the particular implementation, the data files obtained may be specific to a single book or series of books (such, as the "Sherlock Holmes" stories), or they may be applicable to any book to which an actor or director has been assigned.

Furthermore, data files also may be made available, based on data describing the scene props, furniture, scenery, or other background subject material. Based on user selections, the scene could be set in the desert or the jungle, or the furniture pieces set in a particular period or style, such as "French Provincial" or "Danish Modern", and the actor's costumes adjusted to a particular period or style, such as "the 50s" or "the 90s". The content of the data files would describe how to portray the props, costumes, etc. and even may be utilized to define the viewing angle of the user in the particular scene. In this sense, the audio and visual presentation would be fully aware of the three-dimensional aspects of the staging, the appearance of the actors and props, and all other aspects of the appearance of the scene.

Thus, the internal or external data sources may include files which describe scenery, props, scene configuration, phenomes, the visual and audio characteristics of specific actors, the style and techniques of specific directors, or other data useful in the construction of the audio and video presentation of a specific scene.

It will be appreciated that the various components depicted in FIG. 2 may be implemented internally to the electronic book player, externally to the electronic book player, or in any combination of internal and/or external components, and these components may be interconnected through internal data and address buses, external interfaces, or other interconnection methods as required for the particular configuration. Furthermore, these components may be located locally or remotely to each other, in any combination of local or remote location.

The invention claimed is:

1. A method comprising:
   analyzing a predetermined amount of text of a book in terms of content;
   generating, on a display of an electronic device, imagery comprising an action of a figure, a narrator, and a background subject material, that each corresponds to the analyzed content of the predetermined amount of the text of the book;
   activating, via a soft key on the display, a summary feature;
   designating by a user, a given point in the book;
   in response to the activating the summary feature, generating at least one of:
      a recap based on audio of the text of the book that was previously output up to the given point, and
      a summary of the book from the given point to an end of the book;
   generating a pull-down menu in response to a selection of the text, wherein the pull-down menu includes:
      a meaning of the selection of the text, and
      information about a character described in the selection of the text, wherein the pull-down menu includes the information about the character described in the selection of the text when the selection of the text includes a pronoun;
   in response to text of the book being read by the narrator, outputting audio corresponding to speech of the narrator, video of a narration of the speech by the narrator, and the imagery comprising the action of the figure, that each correspond to the read text of the book, and analyzing the read text of the book in terms of content;
   updating the imagery, the narrator, and the background subject material to each correspond to the analyzed content of the read text of the book; and
   coordinating the outputting with the updating to provide an appearance that the action of the figure, the speech of the narrator, and the background subject material each correspond to the analyzed content of the read text of the book.

2. The method of claim 1, further comprising communicating the data over a communications link to output sound that is not a part of the electronic device.

3. The method of claim 2, wherein in response to the audio representing a dialog between two or more people, separate channels of the audio are generated so that each channel corresponds to a particular person.

4. The method of claim 1, further comprising providing an option to specify the narrator and a voice for the narrator, wherein the narrator includes facial features including a mouth, wherein the facial features are coordinated with the audio output corresponding to the data representing text.

5. The method of claim 4, wherein the narrator and the voice are specified by choosing from a stored library the narrator and the voice to correspond to a particular person, and wherein the narrator and the voice are digitized using a plurality of different expressions of a speaker's face.

6. The method of claim 1, further comprising generating images associated with the text to be output on the display.

7. The method of claim 1, further comprising:
outputting audio corresponding to auxiliary information of the book;
coordinating the outputting the audio with the narrator to provide a second appearance that second speech of the narrator corresponds to the auxiliary information.

8. An apparatus comprising:
a display device;
an audio device;
a processor; and
memory for storing data including:
text of a book, and
instructions that are executable by the processor to:
analyze a predetermined amount of text of a book in terms of content,
generate, on the display device, imagery comprising an action of a figure, a narrator, and a background subject material, that each corresponds to the analyzed content of the predetermined amount of the text of the book,
activate, via a soft key on the display, a summary feature,
designate, by a user, a given point in the book,
in response to activation of the summary feature, generate at least one of:
a recap based on audio of the text of the book that was previously output up to the given point, and
a summary of the book from the given point to an end of the book,
generate a pull-down menu in response to a selection of the text, wherein the pull-down menu includes:
a meaning of the selection of the text, and
information about a character described in the selection of the text, wherein the pull-down menu includes the information about the character described in the selection of the text when the selection of the text includes a pronoun,
output audio corresponding to speech of the narrator, video of a narration of the speech by the narrator, and the imagery comprising the action of the figure, that each correspond to the read text of the book,
analyze the read text of the book in terms of content,
update the imagery, the narrator, and the background subject material to each correspond to the analyzed content of the read text of the book, and
coordinate the outputting with the updating to provide an appearance that the action of the figure, the speech of the narrator, and the background subject material each correspond to the analyzed content of the read text of the book.

9. The apparatus of claim 8, wherein the instructions are further executable to provide an option to specify the narrator and a voice for the narrator, wherein the narrator includes facial features including a mouth, the facial features coordinated with the audio output corresponding to the data.

10. The apparatus of claim 8, wherein the instructions are further executable to generate images associated with the text to be output on the display device.

11. One or more tangible computer readable media storing executable instructions that, in response to being executed, cause a computer to perform operations comprising:
analyzing a predetermined amount of text of a book in terms of content;
generating, on a display of an electronic device, imagery comprising an action of a figure, a narrator, and a background subject material, that each corresponds to the analyzed content of the predetermined amount of the text of the book;
activating, via a soft key on the display, a summary feature;
designating, by a user, a given point in the book;
in response to the activating the summary feature, generating at least one of:
a recap based on audio of the text of the book that was previously output up to the given point, and
a summary of the book from the given point to an end of the book;
generating a pull-down menu in response to a selection of the text, wherein the pull-down menu includes:
a meaning of the selection of the text, and
information about a character described in the selection of the text, wherein the pull-down menu includes the information about the character described in the selection of the text when the selection of the text includes a pronoun;
in response to text of the book being read by the narrator, outputting audio corresponding to speech of the narrator, video of a narration of the speech by the narrator, and the imagery comprising the action of the figure, that each correspond to the read text of the book, and analyzing the read text of the book in terms of content;
updating the imagery, the narrator, and the background subject material to each correspond to the analyzed content of the read text of the book; and
coordinating the outputting with the updating to provide an appearance that the action of the figure, the speech of the narrator, and the background subject material each correspond to the analyzed content of the read text of the book.

12. The one or more tangible computer readable media of claim 11, wherein the instructions are further executable to provide an option to specify the narrator and a voice for the narrator, wherein the narrator includes facial features including a mouth, wherein the facial features are coordinated with the audio output corresponding to data representing the text.

13. The one or more tangible computer readable media of claim 11, wherein the instructions are further executable to generate images associated with the text to be output on the display device.

14. The method of claim 1, wherein the background subject material includes at least one of scene props, furniture, scenery, or costume.

15. The method of claim 1, further comprising executing instructions to implement a video effects generator by digital signal processing components to generate facial expressions of at least the figure.

16. The apparatus of claim 8, wherein the instructions are further executable to implement a video effects generator to generate facial expressions of at least the figure.

17. The one or more tangible computer readable media of claim 11, wherein the instructions are further executable to implement a command line to generate facial expressions of at least the figure.

* * * * *